(12) United States Patent
Almendros Gómez et al.

(10) Patent No.: US 8,550,398 B2
(45) Date of Patent: Oct. 8, 2013

(54) OPTIMIZATION OF STRUCTURES SUBJECTED TO HOT GAS STREAMS

(75) Inventors: José Javier Almendros Gómez, Madrid (ES); Yolanda De Gregorio Hurtado, Madrid (ES)

(73) Assignee: Airbus Operations S.L., Madrid (ES)

( * ) Notice: Subject to any disclaimer, the term of this patent is extended or adjusted under 35 U.S.C. 154(b) by 299 days.

(21) Appl. No.: 13/091,202

(22) Filed: Apr. 21, 2011

(65) Prior Publication Data

US 2012/0153083 A1   Jun. 21, 2012

(30) Foreign Application Priority Data

Dec. 17, 2010   (ES) .................................. 201031879

(51) Int. Cl.
*B64C 5/02*      (2006.01)
*B64C 3/36*      (2006.01)
*B64C 7/00*      (2006.01)

(52) U.S. Cl.
USPC ............................. 244/87; 244/130; 244/133

(58) Field of Classification Search
USPC .......................... 244/87, 121, 123.1, 130, 133
See application file for complete search history.

(56) References Cited

U.S. PATENT DOCUMENTS

| | | | | |
|---|---|---|---|---|
| 3,712,566 A | * | 1/1973 | Branen et al. | 244/117 A |
| 6,341,747 B1 | * | 1/2002 | Schmidt et al. | 244/123.1 |
| 8,276,847 B2 | * | 10/2012 | Manz | 244/123.1 |
| 2006/0145008 A1 | * | 7/2006 | Castillo et al. | 244/121 |

* cited by examiner

*Primary Examiner* — Rob Swiatek
(74) *Attorney, Agent, or Firm* — Casimir Jones SC

(57) ABSTRACT

Optimization of structures subjected to hot gas streams. The invention refers to a fairing (10) for aircraft horizontal stabilizer (3) comprising a front part (11) and a rear part (12), the front part (11) covering a limited extent of the fairing (10) surface, which is the part of the fairing (10) receiving hot air stream (6) coming from the aircraft engines (4), this front part (11) being made of an anti-erosion material, the rear part (12) covering the rest of the surface of the fairing (10), this rear part (12) being made of a material resisting the aerodynamic loads existing on the fairing (10). The invention also refers to an aircraft comprising a horizontal stabilizer (3) with a fairing (10) such as the one described.

11 Claims, 4 Drawing Sheets

OPTIMIZATION OF STRUCTURES SUBJECTED TO HOT GAS STREAMS

CROSS-REFERENCE TO RELATED APPLICATION

The present application claims priority to pending Spanish Patent Application No. ES201031879, filed Dec. 17, 2010, the contents of which are incorporated by reference in its entirety.

FIELD OF THE INVENTION

The present invention refers to the optimisation of structures that are subjected to hot streams from gases, in particular, to an aircraft fairing design and, more in particular, to the fairing design of the horizontal stabilizer of an aircraft.

BACKGROUND OF THE INVENTION

An aircraft fairing is a structure whose primary function is to produce a smooth outline and reduce drag. These structures are covers for gaps and spaces between parts of an aircraft, thus reducing drag and interference drag in these parts, also improving the aircraft appearance.

On aircraft, fairings are commonly used on elevator and horizontal stabilizer tips, on engine cowlings, on fin and rudder tips, and on wing root and wing tips. Particularly in the case of fairings on elevator and horizontal stabilizer tips, the fairing has the objective of smoothing out the airflow at the tips.

Fairings on aircraft horizontal stabilizers suffer from erosion degrading them after time, as the rest of fairings present in the aircraft, as they are elements working in particularly erosive environments. However, these fairings also suffer from erosion coming from the hot air stream from the engines (higher temperature and speed conditions), the erosion issue therefore being a main issue in the design of these horizontal stabilizers' fairings, specially in cases of small aircraft, with a short distance between the wing and the tail. This effect coming from the hot air stream from the engines is particularly relevant in the cases of aircraft landing and take-off. Thus, these fairings are not made as light and cheap as they could because of the erosion requirements limitation, therefore being provided with specific anti-erosion protection. A further consideration to be taken into account is the complicated and twisting surface of these fairings. All the above-mentioned considerations and requirements force the manufacturing of fairings for horizontal stabilizers as full parts in a non-optimal way, in order to resist erosion degradation.

For the reasons mentioned, fairings for horizontal stabilizers are manufactured from a metallic material, additionally comprising erosion protection areas to avoid the base element being deteriorated.

Due to the special configuration and twisting shape of fairings in horizontal stabilizers, these fairings are made at present mainly from metallic sheets being shaped and joined afterwards, by welding or by rivets. These known fairings have the problem of requiring costly and time consuming inspection requirements, such as x-ray, also having higher manufacturings costs, because of the manual processes employed. Besides, these elements present quality problems because of their particular shaping, typically known as oil canning. By oil canning, it is meant a moderate deformation or buckling of the flat sheet material made of metal, typically caused by uneven stresses at fastening points. Furthermore, it is becoming more difficult to find appropriate surface protection treatments in these elements, taking into account that special surface protection against erosion is mandatory in such kind of elements.

Known solutions are focused at present in the use of metal fairings: because of the big dimensions of these elements and the related weight considerations, the most commonly used metal is aluminum (though a fairing made in composite material would anyhow be lighter). However, aluminum material would not resist long or mid-term erosion from the hot air stream coming from the engines. Furthermore, once a metallic sheet has been shaped and joined, a further protection against corrosion has to be added, together with a specific erosion protection, such as painting. This has the problem of not assuring a permanent protection of the element, as some parts of this element can be damaged or not properly covered with such protections. In some case, stainless steel is used as a further cover protecting the fairing: in such cases, this protection is bonded or cocured over the fairing, which limits both the thickness of the material and the process used.

It would thus be desirable to provide an optimised fairing for the horizontal stabilizer of an aircraft, overcoming the above-mentioned drawbacks.

The present invention is oriented towards this need.

SUMMARY OF THE INVENTION

An object of the present invention is to provide an optimised aircraft fairing design, in particular, an optimised fairing design for the horizontal stabilizer of an aircraft.

According to the invention, the fairing comprises a front part and a rear part, the front part being arranged such that it covers a limited extent of the fairing, which is the part of the fairing receiving hot air stream coming from the engines. The front part in the fairing is manufactured for resisting erosion degradation, whereas the rear part of the fairing has the requirements of providing the dimensional configuration of the fairing, this rear part being made of a single unitary piece.

The front and rear parts of the fairing according to the invention are overlapped and further joined by using rivets. For this reason, the rear part over which the front part overlaps is enlarged so that the front part is supported on it. The stronger requirements are then to be taken in the design and structure of the front part, which is the part of the fairing resisting erosion.

Other characteristics and advantages of the present invention will be clear from the following detailed description of embodiments illustrative of its object in relation to the attached figures.

DETAILED DESCRIPTION OF THE INVENTION

On aircraft, fairings 1 are commonly used on elevator and horizontal stabilizer tips, on engine cowlings, on fin and rudder tips, and on wing root and wing tips. Particularly in the case of fairings on elevator and horizontal stabilizer tips, the fairing has the objective of smoothing out the airflow at the tips.

Figure 1:
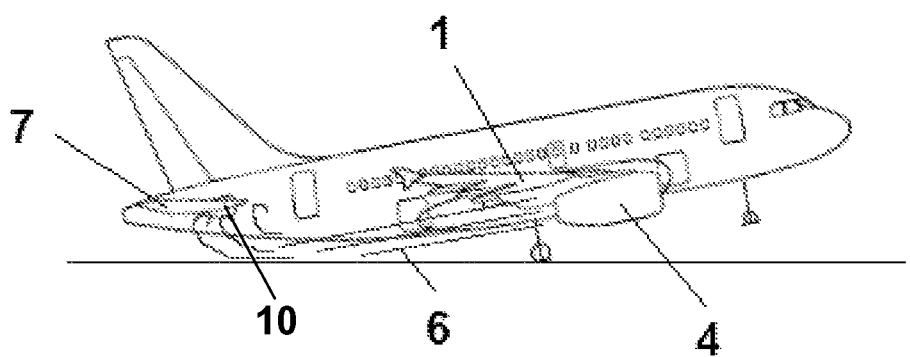
FIG. 1 shows a general view of the take-off of an aircraft, showing the area of the aircraft horizontal stabilizer suffering from heat stream coming from the engines.
Figure 2:
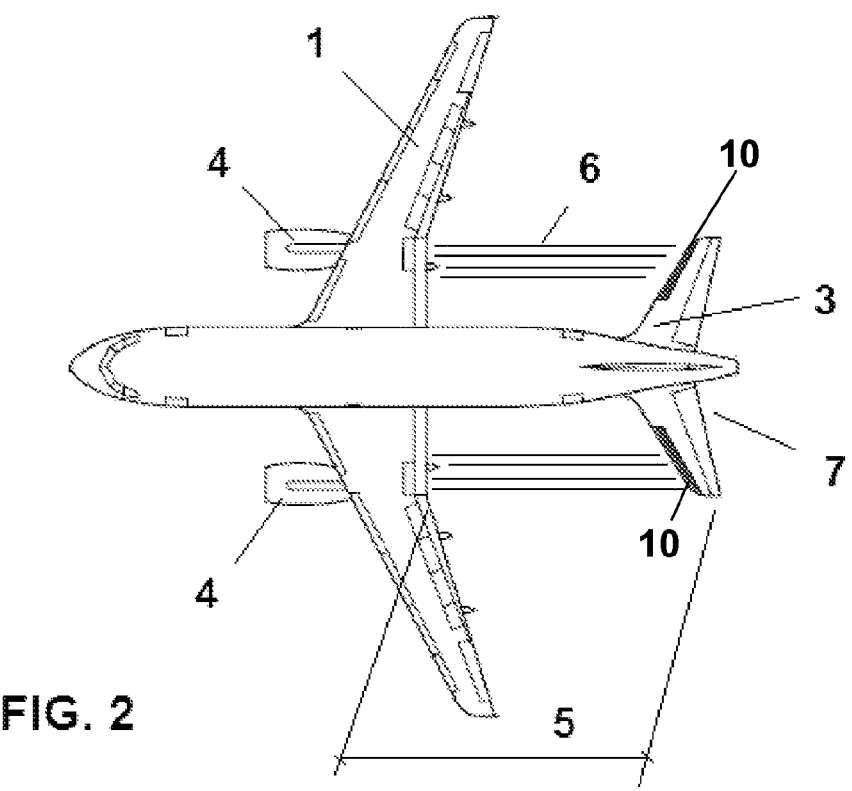
FIG. 2 shows a plan view of an aircraft in flight, further showing the areas of the horizontal stabilizer that are subjected to a hot air stream coming from the engines.
Figure 3A:
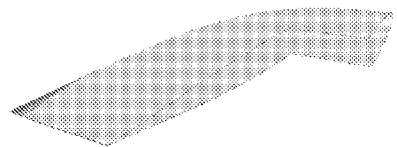
FIGS. 3a, 3b and 3c show different views of the structure of the fairing of an aircraft horizontal stabilizer according to the present invention.
Figure 3B:
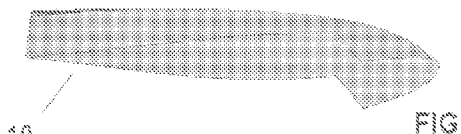
Figure 3C:
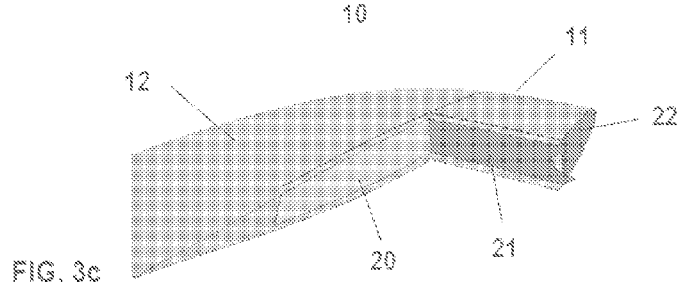

As it is shown in FIGS. 1 and 2, fairings 10 on aircraft horizontal stabilizers 3 particularly suffer from erosion as they also withstand a hot air stream 6 coming from the engines 4, which is particularly relevant for the cases in which there exists a short distance 5 between the wing 1 and the tail 7, as it is shown in FIG. 2 (where it has been shaded the area of the horizontal stabilizer 3 which can suffer from erosion coming from the hot air stream 6 from the aircraft engines 4). As a reference, the distance 5 between the wing and the tail 7 is considered short when it is 20 meters or less, which happens for short haul aircraft having medium capacity of around 150 passengers. This effect of the hot air stream 6 from the engines 4 is particularly relevant in the cases of aircraft landing and take-off (see FIG. 1 for the case of take-off).

According to the invention, an aircraft fairing 10 is proposed, particularly for the horizontal stabilizer 3 of an aircraft, such that this fairing 10 is basically an aerodynamic cover of the tip part of the horizontal stabilizer 3 of the aircraft. The fairing 10 of the invention comprises a front part 11 and a rear part 12: the front part 11 is mainly suffering from erosion coming from the hot air stream 6 from the engines 4, whereas the rear part 12 is designed by aerodynamic loads only. Therefore, the front part 11 is arranged such that it covers a limited extent of the fairing 10, which is the part of the fairing 10 receiving hot air stream coming from the aircraft engines 4, which is typically 10% or less of the total overall length of the fairing 10; the rear part 12 covers the rest of the surface of the fairing 10. The front part 11 in the fairing 10 is manufactured for resisting erosion degradation, whereas the rear part 12 of the fairing 10 has the requirements of providing the dimensional configuration of the cited fairing 10, this rear part 12 being made of a single unitary piece. The fact that this rear part 12 is made of a single piece makes interchangeability possible, which is certainly advantageous for maintenance and repairing needs.

The front and rear parts of the fairing 10 according to the invention are overlapped and further joined preferably by rivets. For this reason, the rear part 12 over which the front part 11 overlaps is enlarged so that the front part 11 is supported on it. Highest requirements are then to be taken in the design and structure of the front part 11, which is the part of the fairing 10 resisting erosion.

The front part 11 of the fairing 10 is preferably manufactured using an anti-erosion material, this front part 11 being assembled or joined to the rear part 12 which is the main structure of the fairing 10, this rear part 12 being enlarged in order to support the front part 11. This front part 11 may be heavier than the traditional parts in known fairings, but it has a better behaviour against erosion. However, taking into consideration what has been previously cited, the rear part 12, which is also the main and bigger part of the fairing 10 is made from a material completely different from that of the front part 11, as this rear part 12 is not affected by erosion, so a slimmer, lighter and cheaper part is designed and manufactured.

Preferably, the front part 11 is made of a metallic material, preferably steel. According to another embodiment of the invention, the front part 11 comprises a metallization in its external surface. Also, the front part 11 can comprise nanoparticles.

In the particular case in which the distance 5 from the aircraft wing 1 to the aircraft tail 7 is short (as cited before, typically less than 20 meters), the horizontal surface with respect to the aircraft flight direction of the horizontal stabilizer 3 is affected by the hot air stream 6 coming from the engines 4, causing an increased erosion effect on the tail 7 surfaces.

Figure 4A:
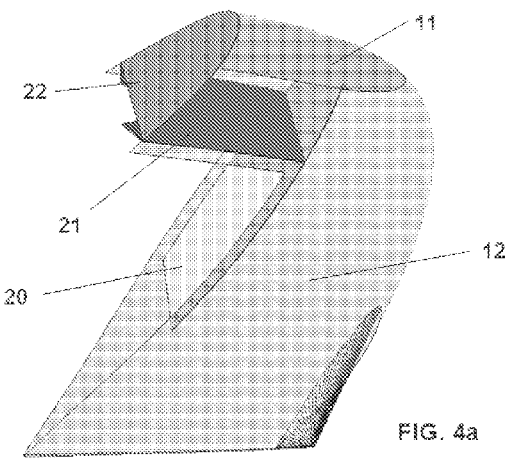
FIGS. 4a and 4b show further details and views of the fairing design structure according to the present invention.
Figure 4B:
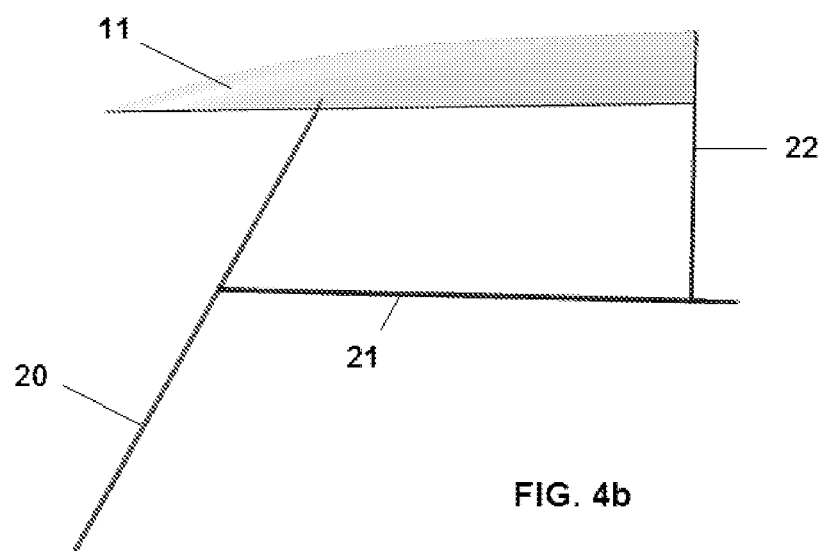

According to the invention, the front 11 part and the rear part 12 of the fairing 10 can be separated, as shown in FIGS. 4a and 4b: some structural elements in the primary structure of the horizontal stabilizer 3, such as ribs, could be enlarged in order to support the front part 11 of the fairing 10 specifically suffering from erosion and protected against it. In FIGS. 4a and 4b, these enlarged elements are ribs, marked as 20, 21 and 22. With this configuration, the front part 11 of the fairing 10 transfers loads to the structure of the horizontal stabilizer 3, such that this front part 11 is then designed following only erosion requirements (erosion from the hot air stream of the engines 4), so it can be made lighter and be optimised; therefore, the whole fairing 10 design is optimised, according to the present invention.

According to a preferred embodiment of the invention, the front part 11 of the fairing 10, which is the one designed for resisting erosion, is made of stainless steel having a very low thickness supported by the rear part 12 made of composite material, preferably of CFRP (carbon fiber-reinforced polymer) or GFRP (glass fiber-reinforced polymer). The rear part 12 is made in one single piece, of one shoot. Thus, in this case, welding and special inspection requirements are avoided. This structure of the rear part 12 is lighter and cheaper than the traditional ones, as in the traditional one quality control is an issue and lots of man hours are necessary for effecting an assembly of all parts together. Typically, the front part 11 of the fairing 10 is made of stainless steel having a thickness of about 0.4 mm, which has proved to be satisfactory, as this front part 11 is designed only for erosion resistance; however, an additional support element or a thickness increase in this front part 11 can be made necessary for aerodynamic loads design or for joining needs, for example.

Although the present invention has been fully described in connection with preferred embodiments, it is evident that modifications may be introduced within the scope thereof, not considering this as limited by these embodiments, but by the contents of the following claims.

The invention claimed is:

1. Fairing (10) for aircraft horizontal stabilizer (3) comprising a front part (11) and a rear part (12), wherein the front part (11) is the part of the fairing (10) receiving hot air stream (6) coming from the aircraft engines (4), this front part (11) being made of an anti-erosion material, the rear part (12) being made of a material resisting the aerodynamic loads existing on the fairing (10), wherein the rear part (12) is a single unitary piece enlarged in order to allow the front part (11) to overlap said rear part (12), wherein the front part (11) and the rear part (12) are further joined by rivets.

2. Fairing (10) according to claim 1, wherein the front part (11) comprises a 10% or less of the total overall length of the fairing (10).

3. Fairing (10) according to claim 1, wherein the front part (11) is made of metal.

4. Fairing (10) according to claim 3, wherein the front part (11) is made of stainless steel, with a thickness of about 0.4 mm.

5. Fairing (10) according to claim 1, wherein the front part (11) comprises an external metallisation.

6. Fairing (10) according to claim 1, wherein the front part (11) comprises nanotubes.

7. Fairing (10) according to claim 1, wherein the rear part (12) is made of composite material.

8. Fairing (10) according to claim 7, wherein the rear part (12) is made of CFRP (carbon fiber-reinforced polymer).

9. Fairing (10) according to claim 7, wherein the rear part (12) is made of GFRP (glass fiber-reinforced polymer).

10. Aircraft comprising a horizontal stabilizer (3) with a fairing (10) according to claim 1.

11. Aircraft according to claim 10, wherein the distance between the wing (1) and the tail (7) is less than 20 meters.

* * * * *